United States Patent [19]
Clements, Jr. et al.

[11] Patent Number: 5,085,175
[45] Date of Patent: Feb. 4, 1992

[54] ANIMAL LITTER

[75] Inventors: Luther D. Clements, Jr., Lincoln; Holmes, Carlton S., Grant, both of Nebr.

[73] Assignee: Board of Regents, University of Nebraska, Lincoln, Nebr.

[21] Appl. No.: 633,965

[22] Filed: Dec. 26, 1990

[51] Int. Cl.$^5$ ............................................. A01K 1/015
[52] U.S. Cl. ................................................... 119/171
[58] Field of Search .................................. 119/171, 172

[56] References Cited
U.S. PATENT DOCUMENTS

| | | | |
|---|---|---|---|
| 4,258,660 | 3/1981 | Pris et al. | 119/171 |
| 4,405,354 | 9/1983 | Thomas, II et al. | 119/171 X |
| 4,506,628 | 3/1985 | Stockel | 119/171 X |
| 4,560,527 | 12/1985 | Harke et al. | 119/172 X |
| 4,607,594 | 8/1986 | Thacker | 119/173 X |
| 4,621,011 | 11/1986 | Fleischer et al. | 119/172 X |
| 4,622,920 | 11/1986 | Goss | 119/171 X |
| 4,641,605 | 2/1987 | Gordon | 119/171 X |
| 4,676,196 | 6/1987 | Lojek et al. | 119/171 X |
| 4,727,824 | 3/1988 | Ducharme et al. | 119/171 |
| 4,794,022 | 12/1988 | Johnson et al. | 119/171 X |
| 4,827,871 | 5/1989 | Morrison | 119/171 |
| 4,872,420 | 10/1989 | Shepard | 119/171 X |
| 4,883,021 | 11/1989 | Ducharme et al. | 119/171 |

Primary Examiner—Gene Mancene
Assistant Examiner—Thomas Price
Attorney, Agent, or Firm—Vincent L. Carney

[57] ABSTRACT

To provide an animal litter from seed hulls such as sunflower hulls, seed hulls having a fatty acid content between 1 percent to 15 percent by weight, at least 40 percent of the fatty acid being unsaturated fatty acid and being between 50 to 95 percent by weight of hulls, is formed as pellets without substantial added binder. The seed hulls serve the function of aiding in pellet forming to avoid the need of substantial added binder as well as aiding in deodorizing. One appropriate additional deodorizing material that may be an added ingredient is alfalfa. The pellets are preferably formed to sizes between 3/64 to 1 inch in diameter but the size is related to the heating and cooling of the pelletizer.

19 Claims, 1 Drawing Sheet

ANIMAL LITTER

BACKGROUND OF THE INVENTION

This invention relates to animal litters.

One type of animal litter contains natural agricultural materials. These materials are chosen for their ability to absorb moisture and odors, neutralize high pH materials such as ammonia or amines and provide other beneficial effects such as the effect of chlorophyll as a deodorizing agent. Sunflower hulls are used as one of the natural ingredients for its sorption ability. The animal litter is prepared by grinding and then pelletized using a binder.

A prior art animal litter of this type is disclosed in U.S. Pat. No. 4,258,660 and U.S. Pat. No. 3,923,005. These patents disclose an animal litter formulation utilizing alfalfa as a deodorizing agent and sunflower hulls as a minor ingredient of between 10-35 percent by weight of the composition. A binder is used in the pelletizing processes.

The prior art animal litters and methods of making them have the disadvantages of being more expensive than necessary because of the required pelletizing binder and, in some instances, of using materials that are more expensive than necessary and of lower sorptive ability than desired. Generally, they use only a small amount of sunflower hulls and do not disclose the ability of sunflower hulls to serve as a binder if used in adequately large quantities as well as being useful in those larger quantities as a superior sorptive agent.

SUMMARY OF THE INVENTION

Accordingly, it is an object of the invention to provide a novel animal litter.

It is a further object of the invention to provide a novel method for making animal litters.

It is a still further object of the invention to provide an animal litter which includes as its major ingredient, seed hulls such as sunflower hulls which serve multiple purposes in the animal litter.

In accordance with the above and further objects of the invention, an animal litter is formed that includes as its major ingredient, seed hulls. The hulls should have a fatty acid content of at least 1 percent and generally between 1 percent to 15 percent by weight. At least 40 percent of the fatty acid should be unsaturated fatty acid. In the preferred embodiment, the hulls should be sunflower seed hulls and preferably confectionary sunflower seed hulls.

The preferred embodiment includes as ingredients between 50 and 95 percent by weight of sunflower hulls and a deodorizing agent capable of one or more of the functions of neutralizing high pH materials, inhibiting or destroying microbial growth or otherwise neutralizing or masking odors although the sunflower hulls are capable of this function. The animal litter is formed as pellets without substantial added binder because the seed hulls serve the function of aiding in pellet forming so as to avoid the need of substantial added binder as well as aiding in deodorizing. One appropriate deodorizing material that may be an added ingredient is alfalfa.

The pellets are preferably formed to sizes between 3/64 to 1 inch in diameter but the size is related to the heating and cooling of the pelletizer. The animal litter is pelletized without the addition of a separate binder but instead relying on the sunflower hulls to provide a binding action to decrease the degree of dusting, to reduce sticking to animals and to provide good crush strength.

From the above description, it can be understood that the animal litter and method of making it of this invention have several advantages, such as: (1) they may be formed entirely of natural agricultural products; (2) they do not require the addition of a binder to provide appropriate pelletizing; and (3) they provide superior absorption of odors and waste material.

SUMMARY OF THE DRAWINGS

The above noted and other features of the invention will be better understood from the following detailed description when considered with reference to the accompanying drawings in which.

DETAILED DESCRIPTION

Figure 1:
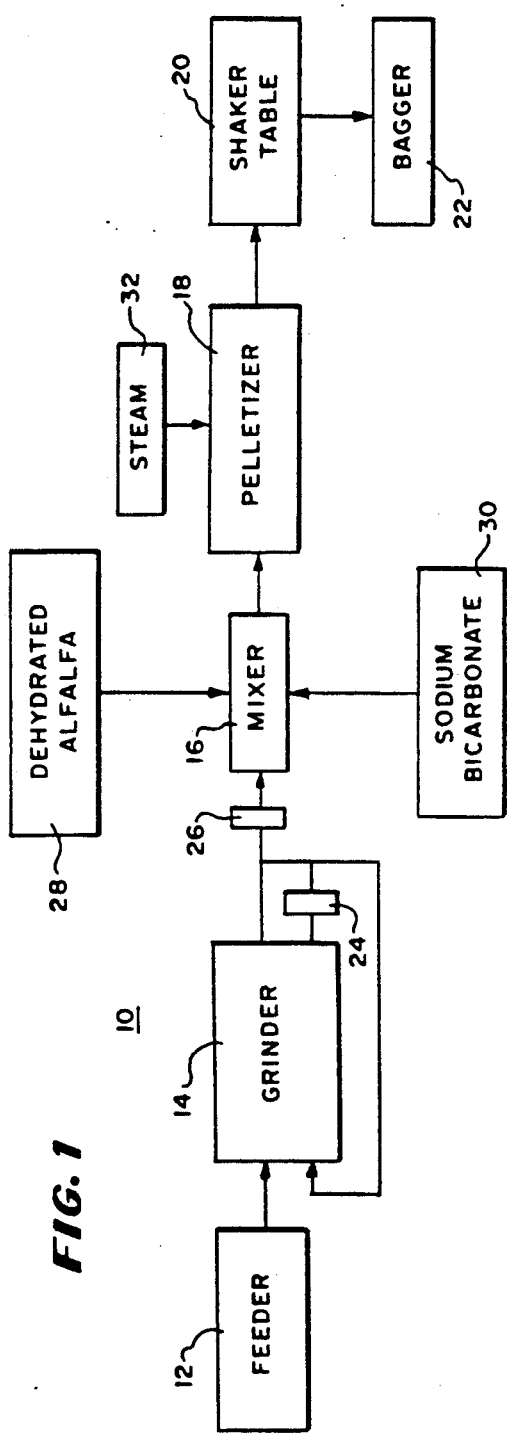
FIG. 1 is a block diagram of a system for preparing animal litter in accordance with the invention.

Broadly, the animal litter includes certain seed hulls having a high fatty acid content as a major ingredient, the seed hull content being above 50 percent by weight of the animal litter. The seed hulls provide the unexpected property to the animal litter of increased absorption, better pelleting without the addition of a binder and odor control at best partly from the seed hulls. The hulls should have a fatty acid content of at least 1 percent and generally between 1 percent to 15 percent by weight. At least 40 percent of the fatty acid should be unsaturated fatty acid. In the preferred embodiment, the hulls should be sunflower seed hulls and preferably confectionary sunflower seed hulls.

Preferably, the animal litter is formed substantially of natural agricultural products such as alfalfa and sunflower hulls with approximately 95 percent by weight being composed of sunflower hulls or other oil bearing seed hulls. For example, sunflower seed hulls have an oil content of between 2.5 percent and 10 percent with the major component of the oil being linoleic acid, a diunsaturated highly reactive fatty acid. This reactive oil appears to also have deodorizing properties. The other ingredients may be added to further neutralize ammonia and amines and to destroy undesirable microbial growth or to block odor.

Generally, oil seed sunflower seed hulls have an oil content of approximately 2.5 to 3 percent by weight with 15 to 16 percent of the fatty acids by weight being oleic acid and 65 to 70 percent by weight being linoleic acid. Confectioner sunflower seed hulls have an oil content of between 9.5 and 10 percent by weight with 17 to 18 percent of the fatty acids by weight being oleic acid and 60 to 61 percent by weight being linoleic acid. The fatty acid by weight of confectioner sunflower seed hulls is (1) approximately 18 or 19 percent saturated fatty acids; (2) 21 or 22 percent mono-saturated fatty acid; and (3) 60 or 61 percent poly-unsaturated fatty acids. The fatty acid by weight of oilseed sunflower seed hulls is: (1) approximately 12 or 13 percent saturated fatty acids; (2) 19 or 20 percent mono-saturated fatty acids; and (3) 68 or 69 percent poly-unsaturated fatty acids. Other appropriate seed hulls are the hulls of cotton seed, canola seed, safflower seed, linseed and sesame seed or the like.

Generally, pellets are formed that: (1) have reduced capacity to stick to animals; (2) are not easily broken-up by a movement of animals on the litter; (3) are nontoxic; (4) have an initial pH above 2.5 but below 6 and preferably about 3; (5) become neutralized up to a pH of approximately 6.5 in use; (6) have high absorption of odors and waste material such as liquids generally because of their large surface area; and (7) are formed without substantial additional binder or adhesive.

In this specification, the language "without substantial additional binder" or "without substantial additional adhesive" means: (1) without any significant or active amount of inorganic or synthetic substance added to the seed hulls or deodorizer to cause the granules to bind to one another; or (2) without any significant or active amount of organic substance not ordinarily found in the natural materials added for other reasons but instead added specifically to cause the granules to bind to one another; or (3) without any significant or active amount of substances only added as an initiator or catalyst to increase the rate of polymerization of the fatty acids.

To prepare the litter, the sunflower hulls are reduced to relatively small size and combined with the other ingredients selected for their neutralizing capacity and ability to absorb high pH materials such as ammonia and amines and/or ability to inhibit microbial growth and/or ability to block odor. The size of pellets are selected so that in their formation the heat-time relationship is long enough to polymerize the fatty acids to the extent necessary to bind the granular material into a pellet with adequate crush strength but not so long as to bind the pellet to pelletizing dies so strongly that they break apart upon removal.

In FIG. 1, there is shown a block diagram of a pelleting system 10 having a feeder 12, a grinder 14, a mixer 16, a pelletizer 18, a shaker table 20 and a bagger 22. With this equipment, seed hulls are fed by the feeder 12 to the grinder 14 which grinds them to the appropriate consistency prior to their being mixed in the mixer 16 with the other ingredients for forming pellets in the pelletizer 18. Pellets formed in the pelletizer 18 are filtered in the shaker table 20 and bagged in the bagger 22.

To grind the seed hulls to the appropriate consistency, the feeder 12 feeds seed hulls to the grinder 14. In one embodiment, the grinder 14 is a Bear Cat (trademark) rotary grinder but any suitable grinder may be used. During the first pass through the grinder 14, the seed hulls are ground to a coarse powder and filtered through a 3/16 inch screen. The 3/16 inch screen has 3/16 inch diameter openings so that particles of 3/16 of an inch or lower in diameter are passed through the screen. These coarse particles are again ground in the grinder 14 and this time filtered by a 1/16 inch screen resulting in a still finer powder.

To form the appropriate composition, the ground sunflower hull seeds are mixed in the vertical mixer 16 with dehydrated alfalfa from a source of dehydrated alfalfa 28 and with sodium bicarbonate from a source of sodium bicarbonate 30. After mixing, the mixture is applied to the pelletizer 18 along with steam from a source of steam 32. The pelletizer is Sprout Waldron 2-ton pelletizer in the preferred embodiment. The dies are 1/8 inch dies and the resulting pellets are cooled and filtered in the shaker table 20. They are then applied to a bagger 22 and bagged.

In use, the odor of urine from the animal is reduced by neutralization of amines and ammonia. The neutralization reaction is described in "Bailey's Industrial Oil and Fat Products", fourth edition, by Marvin W. Formo, Eric Jungermann, Frank A. Norris and Norman 0. V. Sonntag, published by John Wiley & Sons, New York, New York, the disclosure of which is incorporated herein, and particularly on page 106 of volume 1. The reactions lipid and R COOH is any fatty acid and R1 NH2 is any amine.

Figure 2:
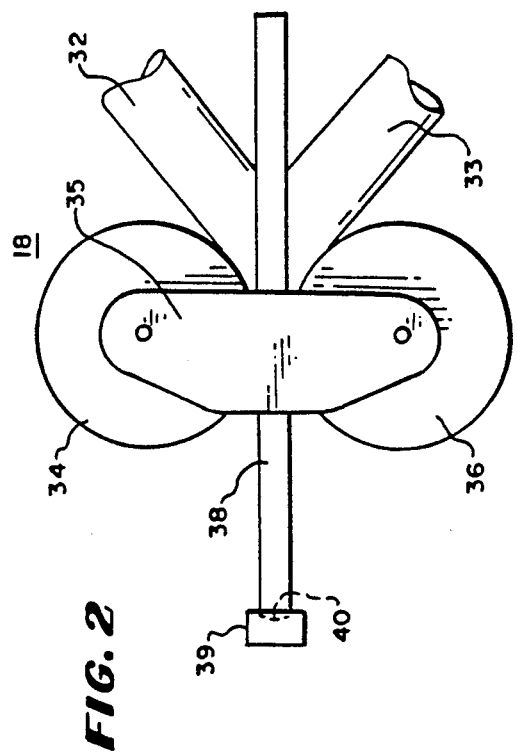
FIG. 2 is a schematic perspective drawing of a pelletizing system used in the embodiment of FIG. 1.

In FIG. 2, there is shown a simplified schematic drawing of a pelletizer 18 having the steam feed 32, rollers 34 and 36 for applying the pellets to a die 38, a roller holder 35 and a die cutter 39 adjacent to a die opening 40. As shown in this embodiment, the seed hulls and other materials are fed and mixed with steam but without a binder and compressed into the small die 38 for forming pellets in a range of 1/16 of an inch through 3/16 of an inch. The dies in the preferred embodiment are tool steel to have sufficient corrosion resistance and sufficient thermal conductivity to form strong pellets that can be removed without breaking apart with the residence time in the die and size of pellet selected.

The die 38 has a die opening 40 out of which the compressed powder is extruded for cutting. The die 38 is shaped to receive the powder and be

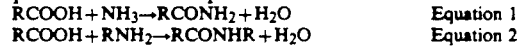

$RCOOH + NH_3 \rightarrow RCONH_2 + H_2O$     Equation 1
$RCOOH + RNH_2 \rightarrow RCONHR + H_2O$     Equation 2 capable of releasing it rapidly as the pellets are formed and moved from the opening 40 by the pressure of the rollers.

In a preferred embodiment, the sunflower seed hulls and deodorizing agent are separately prepared. The deodorizing agent is dehydrated alfalfa being ground to particles approximately 3/64 inch or less in diameter and/or sodium bicarbonate. The sunflower seed hulls are powdered to a greater extent in a conventional hammer mill so that they are dust like. The pelletizing is then performed after adding sodium bicarbonate or some other deodorizing agent. The pelletizing is done by applying steam to the mixture of sodium bicarbonate, alfalfa and powdered or fragmented sunflower seed hulls to form larger units and breaking the units into the desirable size of pellet such as between 3/64 to 1 inch in diameter in a standard hammer mill.

The following non-limitive examples are illustrative of the invention:

EXAMPLES

General Preparation

Seed hulls having an oil content by weight and other larger ingredients are ground and mixed together and with powdered or naturally granular materials. These are then pelletized. In the actual examples, confectionary sunflower seed hulls and dehydrated alfalfa were ground in a hammer mill. They were mixed with sodium bicarbonate in measured quantities and pelletized using low quality steam and a die extruder. The resulting extrudate was cut and cooled.

ACTUAL EXAMPLES

EXAMPLE 1

The sunflower hulls, baking soda and dehydrated alfalfa were ground, combined and pelletized in the following proportions:

| Weight in Pounds | Percentage by Weight | Material |
| --- | --- | --- |
| 5 | 1 | Baking Soda |
| 20 | 4 | Dehydrated Alfalfa |

| | | |
|---|---|---|
| 475 | 95 | Confectionary Sunflower Hulls |

| | |
|---|---|
| First Grind | 3/16 inch diameter |
| Final Grind | ⅛ inch diameter |
| Final Size | ⅛ inch diameter |
| Die Size | ⅛ inch by 1¼ inch |
| Steam Pressure | 50 pounds |
| Steam Temperature | 150 degrees F. |

RESULTS

Good quality pellets ⅛ inch by 1¼ inches by 1¼ inches were made at the rate of 3¼ tons per hour.

EXAMPLE 2

The sunflower hulls, baking soda and dehydrated alfalfa were ground, combined and pelletized in the following proportions:

| Weight in Pounds | Percentage by Weight | Material |
|---|---|---|
| 5 | 1 | Baking Soda |
| 20 | 4 | Dehydrated Alfalfa |
| 475 | 95 | Confectionary Sunflower Hulls |

| | |
|---|---|
| First Grind | 3/16 inch diameter |
| Final Grind | ⅛ inch diameter |
| Final Size | ⅛ inch diameter |
| Die Size | 3/16 by 1¼ inch |
| Steam Pressure | 50 pounds |
| Die Temperature | 145 degrees F. |

RESULTS

Pellets of 3/16 of an inch and 1¼ inches by 1¼ inches were made, but their strength was weak. Pellets were made at a rate of 2 tons per hour. The pellets tended to be too large.

EXAMPLE 3

The sunflower hulls, baking soda and dehydrated alfalfa were ground, combined and pelletized in the following proportions:

| Weight in Pounds | Percentage by Weight | Material |
|---|---|---|
| 5 | 1 | Baking Soda |
| 20 | 4 | Dehydrated Alfalfa |
| 475 | 95 | Confectionary Sunflower Hulls |

| | |
|---|---|
| First Grind | 3/16 inch diameter |
| Final Grind | ⅛ inch diameter |
| Die Size | ⅛ inch by 1¼ inches |
| Steam Pressure | 50 pounds |
| Die Temperature | 145 degrees F. |

RESULTS

Made good pellets approximately ⅛ of an inch by 1¼ inches by 1¼ inches and made them at a rate of ½ ton per hour, but the extruding dies tended to wear excessively and become clogged.

EXAMPLE 4

The sunflower hulls, baking soda and dehydrated alfalfa were ground, combined and pelletized in the following proportions:

| Weight in Pounds | Percentage by Weight | Material |
|---|---|---|
| 5 | 1 | Baking Soda |
| 20 | 4 | Dehydrated Alfalfa |
| 475 | 95 | Confectionary Sunflower Hulls |

| | |
|---|---|
| First Grind | 3/16 inch diameter |
| Final Grind | 1/16 inch diameter |
| Die Size | ⅛ inch by 1¼ inch |
| Steam Pressure | 50 pounds |
| Steam Temperature | 140 degrees F. |

RESULTS

Made good quality pellets ⅛ of an inch by 1¼ inches by 1¼ inches, but only at a rate of ¾ of a ton per hour and there was still too much friction on the extruder dies. The friction tended to damage some pellets and cause them to powder.

EXAMPLE 5

The sunflower hulls, baking soda and dehydrated alfalfa were ground, combined and pelletized in the following proportions:

| Weight in Pounds | Percentage by Weight | Material |
|---|---|---|
| 1 | 1 | Baking Soda |
| 20 | 4 | Dehydrated Alfalfa |
| 475 | 95 | Confectionary Sunflower Hulls |

| | |
|---|---|
| First Grind | 3/16 inch diameter |
| Final Grind | 1/16 inch diameter |
| Die Size | ⅛ by 1¼ inch |
| Steam Pressure | 50 pounds |
| Die Temperature | 145 degrees F. |

RESULTS

Made good quality pellets ⅛ of an inch by 1¼ inches by 1¼ inch at the rate of 1 ton per hour.

EXAMPLE 6

The sunflower hulls, baking soda and dehydrated alfalfa were ground, combined and pelletized in the following proportions:

| Weight in Pounds | Percentage by Weight | Material |
|---|---|---|
| 5 | 1 | Baking Soda |
| 20 | 4 | Dehydrated Alfalfa |
| 475 | 95 | Confectionary Sunflower Hulls |

| | |
|---|---|
| First Grind | 3/16 inch diameter |
| Final Grind | 1/16 inch diameter |
| Die Size | ⅛ inch by 1¼ inch |
| Steam Pressure | 60 pounds |
| Die Temperature | 150 degrees F. |

RESULTS

Made good quality pellets at a rate of 1¼ tons per hour, but the friction was so high that some of them were powdered.

EXAMPLE 7

The sunflower hulls, baking soda and dehydrated alfalfa were ground, combined and pelletized in the following proportions:

| Weight in Pounds | Percentage by Weight | Material |
|---|---|---|
| 20 | 1 | Baking Soda |
| 80 | 4 | Dehydrated Alfalfa |
| 1900 | 95 | Confectionary Sunflower Hulls |
| First Grind | | 3/16 inch diameter |
| Final Grind | | 1/16 inch diameter |
| Die Size | | ⅛ inch by 1¼ inch |
| Steam Pressure | | 70 pounds |
| Die Temperature | | 170 degrees F. |
| RESULTS | | |
| Made good quality ⅛ of an inch by 1¼ inch by 1¼ inch dies at a rate of 2 tons per hour without causing it to be powdered by friction. | | |

EXAMPLE 8

Canola seed hulls and baking soda and dehydrated alfalfa were ground, combined and pelletized in the following proportions:

| Weight in Pounds | Percentage by Weight | Material |
|---|---|---|
| 5 | 1 | Baking Soda |
| 20 | 4 | Dehydrated Alfalfa |
| 475 | 95 | Confectionary Sunflower Hulls |
| First Grind | | 3/16 inch diameter |
| Final Grind | | ⅛ inch diameter |
| Final Size | | ⅛ inch diameter |
| Die Size | | ⅛ inch by 1¼ inch |
| Steam Pressure | | 50 pounds |
| Steam Temperature | | 150 degrees F. |
| RESULTS | | |
| Good quality pellets ⅛ inch by 1¼ inches by 1¼ inches are made at the rate of 3¼ tons per hour. | | |

EXAMPLE 9

Safflower seed hulls, baking soda and dehydrated alfalfa are ground, combined and pelletized in the following proportions:

| Weight in Pounds | Percentage by Weight | Material |
|---|---|---|
| 5 | 1 | Baking Soda |
| 20 | 4 | Dehydrated Alfalfa |
| 475 | 95 | Confectionary Sunflower Hulls |
| First Grind | | 3/16 inch diameter |
| Final Grind | | ⅛ inch diameter |
| Final Size | | ⅛ inch diameter |
| Die Size | | ⅛ inch by 1¼ inch |
| Steam Pressure | | 50 pounds |
| Steam Temperature | | 150 degrees F. |
| RESULTS | | |
| Good quality pellets ⅛ inch by 1¼ inches by 1¼ inches are made at the rate of 3¼ tons per hour. | | |

EXAMPLE 10

The sunflower hulls and baking soda are ground, combined and pelletized in the following proportions:

| Weight in Pounds | Percentage by Weight | Material |
|---|---|---|
| 2 | 5 | Baking Soda |
| 475 | 95 | Confectionary Sunflower Hulls |
| First Grind | | 3/16 inch diameter |
| Final Grind | | ⅛ inch diameter |
| Final Size | | ⅛ inch diameter |
| Die Size | | ⅛ inch by 1¼ inch |
| Steam Pressure | | 50 pounds |
| Steam Temperature | | 150 degrees F. |
| RESULTS | | |
| Good quality pellets ⅛ inch by 1¼ inches by 1¼ inches are made at the rate of 3¼ tons per hour. | | |

EXAMPLE 11

The sunflower hulls and dehydrated alfalfa are ground, combined and pelletized in the following proportions:

| Weight in Pounds | Percentage by Weight | Material |
|---|---|---|
| 25 | 5 | Dehydrated Alfalfa |
| 475 | 95 | Confectionary Sunflower Hulls |
| First Grind | | 3/16 inch diameter |
| Final Grind | | ⅛ inch diameter |
| Final Size | | ⅛ inch diameter |
| Die Size | | ⅛ inch by 1¼ inch |
| Steam Pressure | | 50 pounds |
| Steam Temperature | | 150 degrees F. |
| RESULTS | | |
| Good quality pellets ⅛ inch by 1¼ inches by 1¼ inches are made at the rate of 3¼ tons per hour. | | |

EXAMPLE 12

The sunflower hulls and hydrogen phosphate are ground, combined and pelletized in the following proportions:

| Weight in Pounds | Percentage by Weight | Material |
|---|---|---|
| 25 | 5 | Hydrogen Phosphate |
| 475 | 95 | Confectionary Sunflower Hulls |
| First Grind | | 3/16 inch diameter |
| Final Grind | | ⅛ inch diameter |
| Final Size | | ⅛ inch diameter |
| Die Size | | ⅛ inch by 1¼ inch |
| Steam Pressure | | 50 pounds |
| Steam Temperature | | 150 degrees F. |
| RESULTS | | |
| Good quality pellets ⅛ inch by 1¼ inches | | |

-continued

| | by 1¼ inches are made at the rate of 3½ tons per hour. |

EXAMPLE 13

The sunflower hulls, baking soda and dehydrated alfalfa were ground, combined and pelletized in the following proportions:

| Weight in Pounds | Percentage by Weight | Material |
| --- | --- | --- |
| 5 | 1 | Baking Soda |
| 20 | 4 | Dehydrated Alfalfa |
| 475 | 95 | Confectionary Sunflower Hulls |

| | |
| --- | --- |
| First Grind | 3/16 inch diameter |
| Final Grind | ⅛ inch diameter |
| Final Size | ¼ inch diameter |
| Die Size | ¼ inch by 1¼ inch |
| Steam Pressure | 50 pounds |
| Steam Temperature | 150 degrees F. |

RESULTS
Good quality pellets ¼ inch by 1¼ inches
by 1¼ inches were made at the rate of 3½ tons per hour.

From the above description, it can be understood that the animal litter and method of making it of this invention has several advantages such as (1) it is economical; (2) it is made principally of natural agricultural products; and (3) it provides a superior absorption and deodorizing qualities.

What is claimed is:

1. An animal litter comprising at least 50 percent by weight of seed hull and other materials selected for their deodorizing ability;
said animal litter being without substantial separate binder, whereby the seed hulls are relied upon for binding;
the seed hulls including at least one percent by weight fatty acid.

2. An animal litter according to claim 1 in which at least 40 percent of the fatty acid is unsaturated fatty acid.

3. An animal litter consisting essentially of pellets without substantial added separate binder, said pellets comprising at least 50 percent by weight of seed hull and other materials selected for their deodorizing ability, whereby the seed hulls are relied upon for binding.

4. An animal litter according to claim 3 in which the seed hulls include sunflower seed hulls.

5. An animal litter according to claim 3 in which the seed hulls include at least one percent by weight fatty acid.

6. An animal litter according to claim 5 in which at least 40 percent of the fatty acid is unsaturated fatty acid.

7. An animal litter comprising substantially 95 percent sunflower hulls, 4 percent sun-cured alfalfa and 1 percent sodium bicarbonate.

8. An animal litter comprising
at least 50 percent by weight of seed hulls; and
a deodorizing material;
said litter consisting essentially of pellets without substantial separate binder, said litter being substantially dust, free, whereby the seed hulls are relied upon for binding.

9. An animal litter according to claim 8 in which said particles are in the range of 3/64 inch to 1 inch in diameter.

10. An animal litter according to claim 9 in which the seed hulls include at least one percent by weight fatty acid.

11. An animal litter according to claim 10 in which at least 40 percent of the fatty acid is unsaturated fatty acid.

12. An animal litter according to claim 11 in which the seed hulls include sunflower seed hulls.

13. An animal litter consisting substantially of 95 percent sunflower seed hulls, substantially 4 percent alfalfa and the remainder being deodorizing ingredients, said litter being without separate binder; said seed hulls including at least one percent by weight fatty acid; at least 40 percent of the fatty acid being unsaturated fatty acid, whereby the seed hulls are relied upon for binding.

14. A process of making an animal litter comprising the steps of:
grinding seed hulls to a size no greater than 0.25 inches in diameter mesh;
adding deodorizing ingredients without substantial separate binder while maintaining the proportion of sunflower hulls to at least 50 percent; and
forming into pellets, whereby the seed hulls are relied upon for binding.

15. A process in accordance with claim 14 in which said seed hulls are combined with outer ingredients wherein the seed hulls have at least one percent fatty acid and at least 40 percent of the fatty acid is unsaturated.

16. A process according to claim 14 in which said seed hulls are powdered in a hammer mill, mixed with other ingredients and pelletized with steam in an extruder and then cut to the desired size.

17. A process according to claim 16 in which pellets are formed in the range of 3/64 inch to 1 inch in diameter.

18. A process according to claim 14 wherein the pellets are formed at a temperature high enough and for a long enough time to polymerize unsaturated fatty acids to form strong pellets but low enough and short enough to permit them to be removed intact from the dies of the extruder.

19. A process in accordance with claim 14 in which said seed hulls combined with at least one deodorizing agent without removal of oil from the seed hulls.

* * * * *